United States Patent
Gao et al.

(10) Patent No.: US 12,283,238 B2
(45) Date of Patent: Apr. 22, 2025

(54) DISPLAY SCREEN FREQUENCY CONVERSION METHOD, DDIC CHIP, AND TERMINAL

(71) Applicant: GUANGDONG OPPO MOBILE TELECOMMUNICATIONS CORP., LTD., Guangdong (CN)

(72) Inventors: Yankai Gao, Guangdong (CN); Lei Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/197,934

(22) Filed: May 16, 2023

(65) Prior Publication Data

US 2023/0282162 A1    Sep. 7, 2023

Related U.S. Application Data

(63) Continuation of application No. PCT/CN2021/123579, filed on Oct. 13, 2021.

(30) Foreign Application Priority Data

Nov. 17, 2020    (CN) .......................... 202011287117.4

(51) Int. Cl.
　　*G09G 3/3225*　　(2016.01)
　　*G09G 3/20*　　(2006.01)

(52) U.S. Cl.
　　CPC ......... *G09G 3/3225* (2013.01); *G09G 3/2096* (2013.01); *G09G 2320/06* (2013.01); *G09G 2340/0435* (2013.01)

(58) Field of Classification Search
　　CPC ............... G09G 3/3225; G09G 3/2096; G09G 2320/06; G09G 2340/0435; G09G 3/32;
(Continued)

(56) References Cited

U.S. PATENT DOCUMENTS

| 9,514,511 | B2 | 12/2016 | Lee et al. |
| 2005/0177654 | A1 | 8/2005 | Tomohara |

(Continued)

FOREIGN PATENT DOCUMENTS

| CN | 101702106 A | 5/2010 |
| CN | 102543023 A | 7/2012 |

(Continued)

OTHER PUBLICATIONS

Chinese First Office Action and search report dated Jun. 3, 2021 for the corresponding Chinese Application No. 202011287117.4 its English translation provided by Applicant's foreign counsel.

(Continued)

*Primary Examiner* — Abhishek Sarma
(74) *Attorney, Agent, or Firm* — Ladas & Parry, LLP

(57) ABSTRACT

A display screen frequency conversion method, a DDIC chip, and a terminal are provided. The method includes: outputting a Tearing Effect (TE) signal to an Application Processor (AP) at a first base frame rate, and performing an image scanning and a frame compensating at the first base frame rate; receiving a frequency reducing instruction issued by the AP, wherein the frequency reducing instruction is configured to instruct to reduce a base frame rate of the display screen; and outputting the TE signal to the AP at a second base frame rate based on the frequency reducing instruction and continually performing the image scanning and the frame compensating at the first base frame rate, wherein the second base frame rate is less than the first base frame rate.

18 Claims, 10 Drawing Sheets

(58) Field of Classification Search
CPC ............. G09G 5/18; G09G 2320/0247; G09G 2330/021; Y02D 10/00
See application file for complete search history.

(56) References Cited

U.S. PATENT DOCUMENTS

| | | |
|---|---|---|
| 2015/0015591 A1 | 1/2015 | Oh et al. |
| 2015/0130824 A1 | 5/2015 | Keun et al. |
| 2015/0172590 A1 | 6/2015 | Wang et al. |
| 2017/0110066 A1 | 4/2017 | Luo et al. |
| 2023/0410732 A1* | 12/2023 | Chou .................. G06F 3/14 |

FOREIGN PATENT DOCUMENTS

| | | |
|---|---|---|
| CN | 103137104 A | 6/2013 |
| CN | 103377638 A | 10/2013 |
| CN | 104347023 A | 2/2015 |
| CN | 104637466 A | 5/2015 |
| CN | 105389144 A | 3/2016 |
| CN | 106205460 A | 12/2016 |
| CN | 106652878 A | 5/2017 |
| CN | 108469927 A | 8/2018 |
| CN | 107818772 B | 9/2018 |
| CN | 109067485 A | 12/2018 |
| CN | 109272931 A | 1/2019 |
| CN | 109739333 A | 5/2019 |
| CN | 110174969 A | 8/2019 |
| CN | 110333834 A | 10/2019 |
| CN | 112331145 A | 2/2021 |
| JP | 2014174215 A | 9/2014 |
| KR | 20170023359 A | 3/2017 |
| WO | 2022030996 A1 | 2/2022 |

OTHER PUBLICATIONS

Notification to Grant Patent Right for Invention dated Jan. 6, 2022 for the corresponding Chinese Application No. 202011287117.4 and its English translation provided by Applicant's foreign counsel.

International Search Report (ISR) dated Dec. 9, 2021 for the corresponding PCT Application No. PCT/CN2021/123579 and its English translation provided by WIPO.

Written Opinion (WOSA) dated Dec. 9, 2021 for Application No. PCT/CN2021/123579 and its machine English translation provided by WIPO.

European Search Report of corresponding European Patent Application No. 21893633.4, mailed May 8, 2024 (177 pages).

* cited by examiner

DISPLAY SCREEN FREQUENCY CONVERSION METHOD, DDIC CHIP, AND TERMINAL

CROSS-REFERENCE TO RELATED APPLICATIONS

The present disclosure is a continuation of International Patent Application No. PCT/CN2021/123579, filed on Oct. 13, 2021, which claims priority to Chinese Patent Application No. 202011287117.4, filed on Nov. 17, 2020, the content of which is herein incorporated by reference in their entireties.

TECHNICAL FIELD

Embodiments of the present disclosure relate to the field of display technologies, in particular to a display screen frequency conversion method, a Display Driver Integrated Circuit (DDIC) chip, and a terminal.

BACKGROUND

With continuous development of display technology, more and more display screens with a high refresh rate have emerged. In a process of running a high-frame-rate application or performing a sliding operation, the fluency of images may be improved by setting the display screen to be in a high refresh rate mode.

In some application scenarios, a high refresh rate may improve the fluency of the images and the user's experience. For example, when a high-frame-rate game is running, the high refresh rate may improve the fluency of game images. In some scenarios in which a high frequency refresh is not required, still using the high refresh rate may lead to a high power consumption. For example, when a video with a frame rate of 30 Frame Per Second (FPS) is played, using a refresh rate of 120 Hz may lead to a high power consumption.

SUMMARY

Some embodiments of the present disclosure provide a display screen frequency conversion method, a DDIC chip, and a terminal. The technical scheme is as follows:

In a first aspect, some embodiments of the present disclosure provide a display screen frequency conversion method performed by a Display Driver Integrated Circuit (DDIC) of a display screen. The method includes: outputting a Tearing Effect (TE) signal to an Application Processor (AP) at a first base frame rate, and performing an image scanning and a frame compensating at the first base frame rate; receiving a frequency reducing instruction issued by the AP; and outputting the TE signal to the AP at a second base frame rate based on the frequency reducing instruction and continually performing the image scanning and the frame compensating at the first base frame rate. Herein, the frequency reducing instruction is configured to instruct to reduce a base frame rate of the display screen, and the second base frame rate is less than the first base frame rate.

In a second aspect, some embodiments of the present disclosure provide a Display Driver Integrated Circuit (DDIC) chip applied to an Organic Light Emitting Diode (OLED) display screen. The DDIC chip is configured to: output a Tearing Effect (TE) signal to an Application Processor (AP) at a first base frame rate, and perform an image scanning and a frame compensating at the first base frame rate; receive a frequency reducing instruction issued by the AP; and output the TE signal to the AP at a second base frame rate based on the frequency reducing instruction and continually perform the image scanning and the frame compensating at the first base frame rate. Herein, the frequency reducing instruction is configured to instruct to reduce a base frame rate of the OLED display screen, and the second base frame rate is less than the first base frame rate.

In a third aspect, some embodiments of the present disclosure provide a terminal including an Application Processor (AP), a display screen, and a Display Driver Integrated Circuit (DDIC) chip, the AP and the DDIC chip being connected through a Mobile Industry Processor Interface (MIPI), and the DDIC chip being configured to execute the display screen frequency conversion method as described above.

DETAILED DESCRIPTIONS

In order to make the purposes, technical schemes, and advantages of the present disclosure clearer, embodiments of the present disclosure will be described in detail below in combination with the accompanying figures.

Herein, "a plurality of" mentioned herein refers to two or more. "And/or" describes an association relationship between associated objects and indicates that there may be three kinds of relationships. For example, A and/or B, may indicate that there are three situations: A exists alone, A and B exist at the same time, and B exists alone. The character "/" generally indicates that the associate objects therebefore and thereafter have a relationship of "or".

Figure 1:
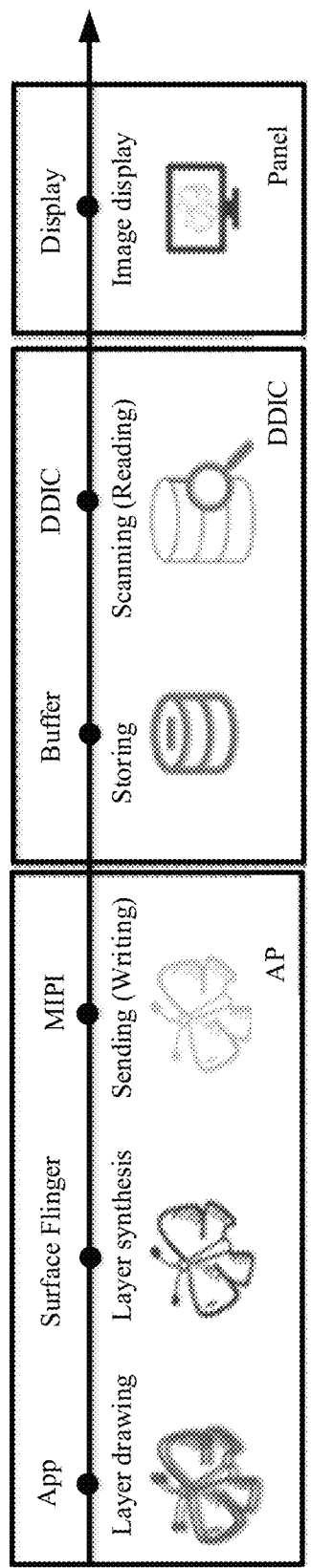
FIG. 1 is a schematic diagram illustrating an image display process under an AP-DDCI-Panel architecture.

As shown in FIG. 1, under an Application Processor-Display Driver Integrated Circuit-Display Panel (AP-DDIC-Panel) architecture, the AP firstly performs a layer drawing and rendering through an application (App), then performs a layer synthesis on the drawn layers through a surface-flinger (i.e., a layer synthesizer) to obtain image data, and finally sends or writes the image data to a DDIC through a Mobile Industry Processor Interface (MIPI). The DDIC stores the image data sent by the AP in a Buffer and controls or enables the Panel to display and refresh images by scanning or reading the image data in the Buffer. When implementing an adaptive frequency conversion, the DDIC may adaptively adjust a refresh rate based on an output frame rate of the AP (i.e., the amount of the image data sent by the AP to the DDIC per unit time, or the speed of the AP sending the image data to the DDIC). For example, when the output frame rate of the AP decreases, the DDIC may reduce the refresh rate, while when the output frame rate of the AP increases, the DDIC may raise the refresh rate.

Tearing Effect (TE), signal is generated by the DDIC chip, and is configured to reduce or prevent a tearing problem when images are refreshed in a process of image display. In response to being ready to refresh a next frame of image, the DDIC chip may generate the TE signal. In some embodiments, the AP may send the data of the next frame of image to the DDIC chip after detecting a rising edge of the TE signal, or after detecting that the TE signal is in a high-level state.

In the related art, the display frequency conversion technology automatically implemented by the DDIC chip within a frequency conversion range is called Adaptive Dynamic Frame Rate (ADFR). For example, when the base frame rate (i.e., the highest refresh rate) of the display screen is 120 Hz and the lowest refresh rate of the display screen is 1 Hz, the DDIC chip may realize a dynamic frequency conversion within a frequency conversion range of 1-120 Hz.

In some embodiments, the DDIC chip may implement the ADFR in frames, and the TE signal generated by the DDIC chip may be consistent with the base frame rate of the display screen. Accordingly, the AP performs an image drawing based on a frequency of the TE signal and sends drawn image frame data to the DDIC chip. The DDIC chip performs an image scanning or an image updating based on the image frame data. In addition, the DDIC chip may also perform a frame compensating between two adjacent image scannings. Herein, the frame compensating is a process of optically compensating a display image based on gamma parameters, so as to reduce the occurrence of sudden changes of an image brightness in a non-image scanning duration.

Figure 2:
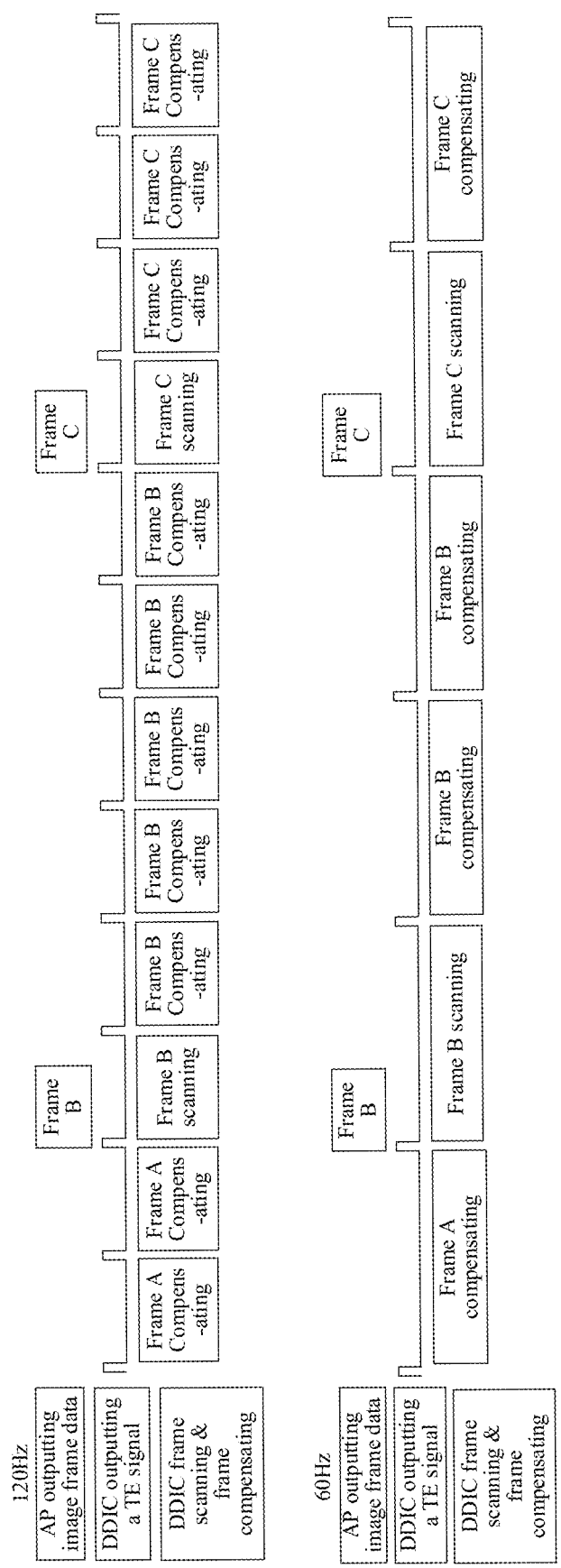
FIG. 2 is a schematic diagram illustrating an implementation of a DDIC chip in the related art executing a frequency conversion process according to a frequency conversion instruction.

In some embodiments, as shown in FIG. 2, when the DDIC chip outputs the TE signal at a frequency of 120 Hz, the AP may perform the image drawing at a frequency of 120 Hz and send the drawn image frame data to the DDIC chip in response to detecting the rising edge of the TE signal (FIG. 2 illustrates a process of sending the image frame data of a frame B and a frame C). After receiving the sent image frame data, the DDIC chip may perform the image scanning (FIG. 2 illustrates an image scanning process of the frame B and the frame C), and perform the frame compensating between two adjacent image scannings (FIG. 2 illustrates a frame compensating process of a frame A, the frame B, and the frame C).

In some scenarios, for the sake of power consumption, the system needs to reduce the base frame rate of the display screen, so as to achieve a dynamic frequency conversion at a refresh rate with a value in a relatively low range, thereby reducing the power consumption of the terminal. In such a scenario, the AP may send a frequency reducing instruction to the DDIC chip. After receiving the frequency reducing instruction, the DDIC chip may change a frequency of the TE signal, a frequency of the image scanning, and a frequency of the frame compensating. Accordingly, the DDIC chip needs a new DDIC timing and new parameters of the display screen (such as gamma parameters, or the like).

As shown in FIG. 2, in response to detecting that the display screen is in a video playing scenario, since the frame rate of a video is generally less than 60 Frame Per Second (FPS), the AP may instruct to reduce the base frame rate from 120 Hz to 60 Hz by issuing the frequency reducing instruction. After receiving the frequency reducing instruction issued by the AP, the DDIC chip may reduce the outputting frequency of the TE signal from 120 Hz to 60 Hz and adjust the frequency of the image scanning and the frequency of the frame compensating of the image frame. After identifying that the frequency of the TE signal output by the DDIC chip decreases, the AP may perform the image drawing at a frequency of 60 Hz. Due to changes in the frequency of the image scanning and the frequency of the frame compensating, the DDIC chip cannot continue using the DDIC timing and the gamma parameters corresponding to 120 Hz. However, the DDIC chip may adopt the DDIC timing and the gamma parameters corresponding to 60 Hz.

When using the aforementioned frequency conversion scheme, in the frequency conversion process, the DDIC chip needs to adjust the frequency of the TE signal, the frequency of the image scanning, and the frequency of the frame compensating, thereby needing to adjust the DDIC timing and the parameters of the display screen. On the one hand, the implementing complexity of the frequency conversion process is increased; on the other hand, changes in parameters of the display screen may cause an image flicker, which affects the quality of the image display.

In order to solve the problem in the aforementioned frequency conversion scheme, some embodiments of the present disclosure break a driving rule of one TE signal for one frame and enable the display screen to be compatible with a variety of base frame rates by improving the TE signal. By adopting the scheme provided by some embodiments of the present disclosure, in response to receiving the frequency reducing instruction issued by the AP, the DDIC chip may reduce the frequency of the TE signal output to the AP and maintain the current frequency of the image scanning and the current frequency of the frame compensating, in this way, there is no need to adjust the DDIC timing and the parameters of the display screen. On the one hand, the implementing complexity of the frequency conversion process is simplified; on the other hand, since the parameters of the display screen do not change, no image flicker will occur in the frequency conversion process, so as to ensure the quality of the image display. The following are illustrative embodiments for explanation.

Figure 3:
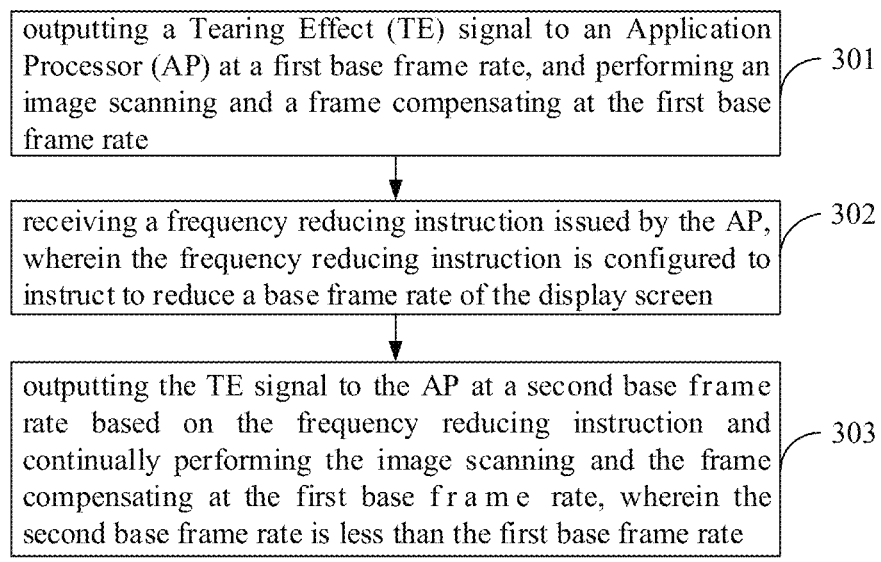
FIG. 3 is a flow chart of a display screen frequency conversion method according to some embodiments of the present disclosure.

As shown in FIG. 3, FIG. 3 is a flow chart of a display screen frequency conversion method according to some embodiments of the present disclosure. Some embodiments are illustrated by performing the method by a DDIC chip of a display screen. The method includes the following operations.

Operation 301, the method includes outputting a Tearing Effect (TE) signal to an Application Processor (AP) at a first base frame rate, and performing an image scanning and a frame compensating at the first base frame rate.

In some embodiments, in response to the frequency reducing instruction being not received, the DDIC chip may output the TE signal to the AP based on the first base frame rate, and the AP may perform an image drawing at the first base frame rate based on the frequency of the received TE signal, and send the drawn image frame data to the DDIC chip in response to detecting a rising edge of the TE signal. After receiving the image frame data sent by the AP, the DDIC chip may perform the image scanning and the frame compensating based on a scanning frequency and a compensating frequency corresponding to the first base frame rate, and the frame compensating is performed between two image scannings. The DDIC chip adopts the DDIC timing and the parameters of the display screen corresponding to the first base frame rate.

Figure 4:
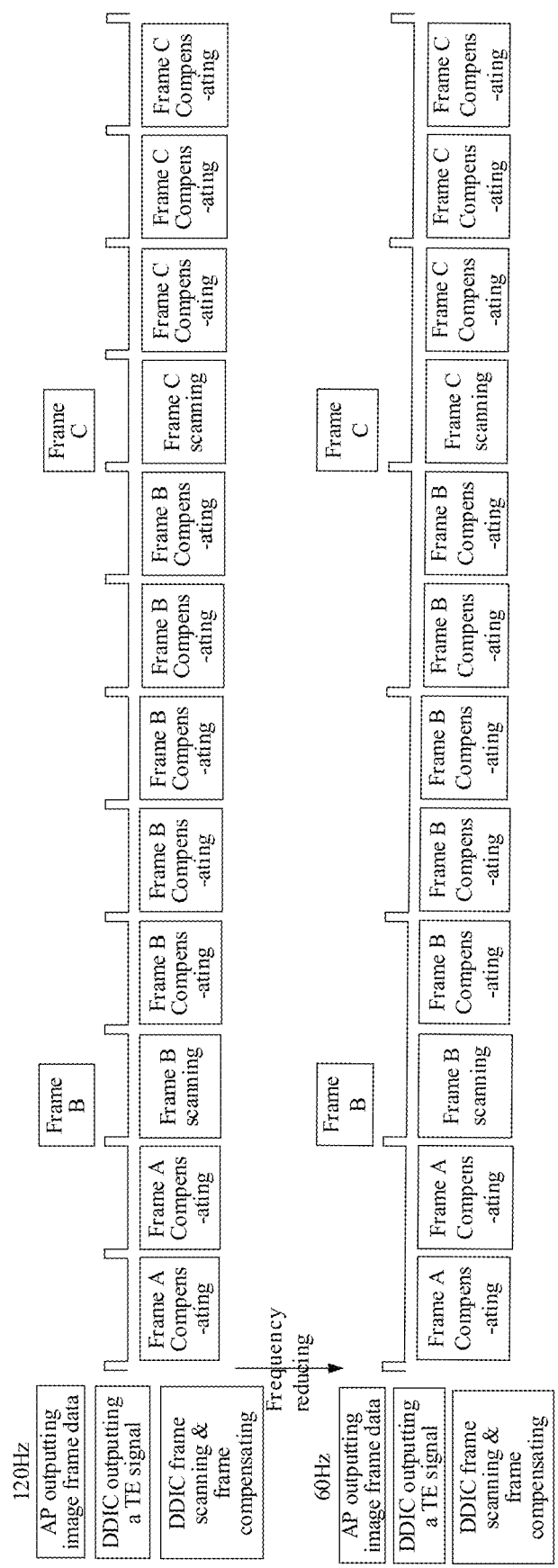
FIG. 4 is a schematic diagram illustrating an implementation of a display screen frequency conversion process according to some embodiments of the present disclosure.

As shown in FIG. 4, in case that the base frame rate of the display screen is 120 Hz, the DDIC chip may output the TE signal at a frequency of 120 Hz, and the AP may perform the image drawing at a frequency of 120 Hz. In response to detecting the rising edge of the TE signal, the AP may send the drawn image frame data to the DDIC chip. After receiving the sent image frame data, the DDIC chip may perform the image scanning and the frame compensating, and the frame compensating is performed between two adjacent image scannings.

Operation 302, the method includes receiving a frequency reducing instruction issued by the AP, and the frequency reducing instruction is configured to instruct to reduce a base frame rate of the display screen.

In some embodiments, in response to detecting that the demand of a foreground application for the base frame rate is less than the current base frame rate of the display screen, since the refresh rate of an entire system is related to the frequency of the TE signal, the AP needs to send the frequency reducing instruction to the DDIC chip to reduce the frequency of the TE signal, so as to reduce the frequency of the image drawing of the AP, in this way, the refresh rate of the entire system may be reduced.

In some embodiments, the AP may obtain an application type of the foreground application and determine a requirement or demand of the foreground application for the base frame rate based on the application type. For example, in case that the frequency of the current TE signal is 120 Hz and the current application is a video application, since the frame rate of a video is generally less than 60 FPS (typically 24 FPS or 30 FPS), the AP may issue the frequency reducing instruction to the DDIC chip.

In some embodiments, the frequency reducing instruction is configured to instruct to reduce a frequency grade by one grade (different frequency grades are preset). Accordingly, the DDIC chip may reduce the frequency by grade based on to the frequency reducing instruction. For example, four frequency grades are preset, and the four frequency grades range from high to low as 120 Hz, 60 Hz, 40 Hz, and 30 Hz. In case that the current base frame rate is 120 Hz, after receiving a frequency reducing instruction issued by the AP, the DDIC chip may determine that the base frame rate needs to be reduced to 60 Hz. In response to receiving a further frequency reducing instruction issued by the AP, the DDIC chip may determine that the base frame rate needs to be reduced to 40 Hz.

In some embodiments, the frequency reducing instruction is configured to instruct to reduce the current base frame rate to a specified base frame rate. For example, the frequency reducing instruction is configured to instruct to reduce the current base frame rate from 120 Hz to 60 Hz or instruct to reduce the current base frame rate from 120 Hz to 30 Hz.

Operation 303, the method includes outputting the TE signal to the AP at a second base frame rate based on the frequency reducing instruction and continually performing or continuing performing the image scanning and the frame compensating at the first base frame rate, and the second base frame rate is less than the first base frame rate.

In some embodiments, the DDIC chip may determine the second base frame rate based on the frequency reducing instruction and output the TE signal to the AP at the second base frame rate. In this way, the AP may reduce a frequency of the image drawing from the first base frame rate to the second base frame rate based on the TE signal of the second base frame rate.

In addition, in order to reduce the complexity of the frequency conversion process and reduce the occurrence of image flicker in the frequency conversion process, in some embodiments of the present disclosure, the DDIC chip may still perform the image scanning and the frame compensating based on the scanning frequency and compensating frequency corresponding to the first base frame rate. Since the frequency of the image scanning and the frequency of the frame compensating do not change, the DDIC chip may continue using the original DDIC timing and the original parameters of the display screen. In this way, not only the frequency conversion implementing process is simplified, but also the occurrence of image flicker caused by the changes of the parameters of the display screen is reduced.

As shown in FIG. 4, the DDIC chip outputs the TE signal at a frequency of 60 Hz based on the received frequency reducing instruction. After identifying that the frequency of the TE signal is 60 Hz, the AP may perform the image drawing at a frequency of 60 Hz. In response to detecting the rising edge of the TE signal, the AP may send the drawn image frame data to the DDIC chip. After receiving the sent image frame data, the DDIC chip may still perform the image scanning and the frame compensating based on the DDIC timing corresponding to 120 Hz. Since the frequency of the image scanning and the frequency of the frame compensating do not change, the DDIC chip does not need to adjust the parameters of the display screen.

In summary, in some embodiments of the present disclosure, in the process of the DDIC outputting the TE signal to the AP based on the first base frame rate, in response to receiving the frequency reducing instruction issued by the AP, the DDIC chip continually performs the image scanning and the frame compensating based on the scanning frequency and the compensation frequency corresponding to the first base frame rate, and reduces the frequency of outputting the TE signal to the AP (the DDIC chip outputs the TE signal at the second base frame rate). In this way, the AP is enabled to reduce the frequency of the image drawing based on the TE signal of the second base frame rate, the complexity and cost of implementing the display screen frequency conversion is reduced by maintaining the original scanning frequency and the original compensating frequency, the occurrence of image flicker caused in the frequency conversion process is reduced, and the quality of the image display in the frequency conversion process is improved.

In addition, after reducing the base frame rate of the display screen, the DDIC chip may perform the dynamic frequency conversion at a refresh rate with a value in relative low range to ensure that the refresh rate maintains at a relatively low level. In this way, the display power consumption of the terminal may be reduced without affecting the quality of the image display.

In some embodiments, the outputting the TE signal to the AP at a second base frame rate based on the frequency reducing instruction includes: determining the second base frame rate based on the frequency reducing ratio instructed by the frequency reducing instruction and the first base frame rate; and outputting the TE signal to the AP at the second base frame rate. Herein, the frequency reducing ratio is 1/N, the second base frame rate is 1/N of the first base frame rate, and N is an integer greater than or equal to 2.

In some embodiments, the outputting the TE signal to the AP at the second base frame rate includes: determining a signal outputting interval based on the second base frame rate; and outputting the TE signal to the AP based on the signal outputting interval. Herein, a frequency of the TE signal received by the AP is the second base frame rate.

In some embodiments, the outputting the TE signal to the AP at the second base frame rate includes: outputting the TE signal with a continuous high level to the AP at the second base frame rate. Herein, a high-level duration of the TE signal with the continuous high level is a duration of N continuous TE signals under the first base frame rate.

In some embodiments, the outputting the TE signal to the AP at the second base frame rate includes: outputting the TE signal to the AP at the second base frame rate starting from a moment of the image scanning.

In some embodiments, the continually performing the image scanning and the frame compensating at the first base frame rate includes: continually performing the image scanning and the frame compensating based on a DDIC timing and parameters of the display screen corresponding to the first base frame rate.

In some embodiments, after the outputting the TE signal to the AP at a second base frame rate based on the frequency reducing instruction and performing the image scanning and the frame compensating at the first base frame rate, the method further includes: receiving a frequency raising instruction issued by the AP; and outputting the TE signal to the AP at a third base frame rate based on the frequency raising instruction and continually performing the image scanning and the frame compensating at the first base frame rate. Herein, the frequency raising instruction is configured to instruct to raise the base frame rate of the display screen, the third base frame rate is greater than the second base frame rate, and less than or equal to the first base frame rate.

In some embodiments, the display screen is an Organic Light Emitting Diode (OLED) display screen.

In some embodiments, the method is performed by the DDIC chip of the display screen in a mobile terminal.

Figure 5:
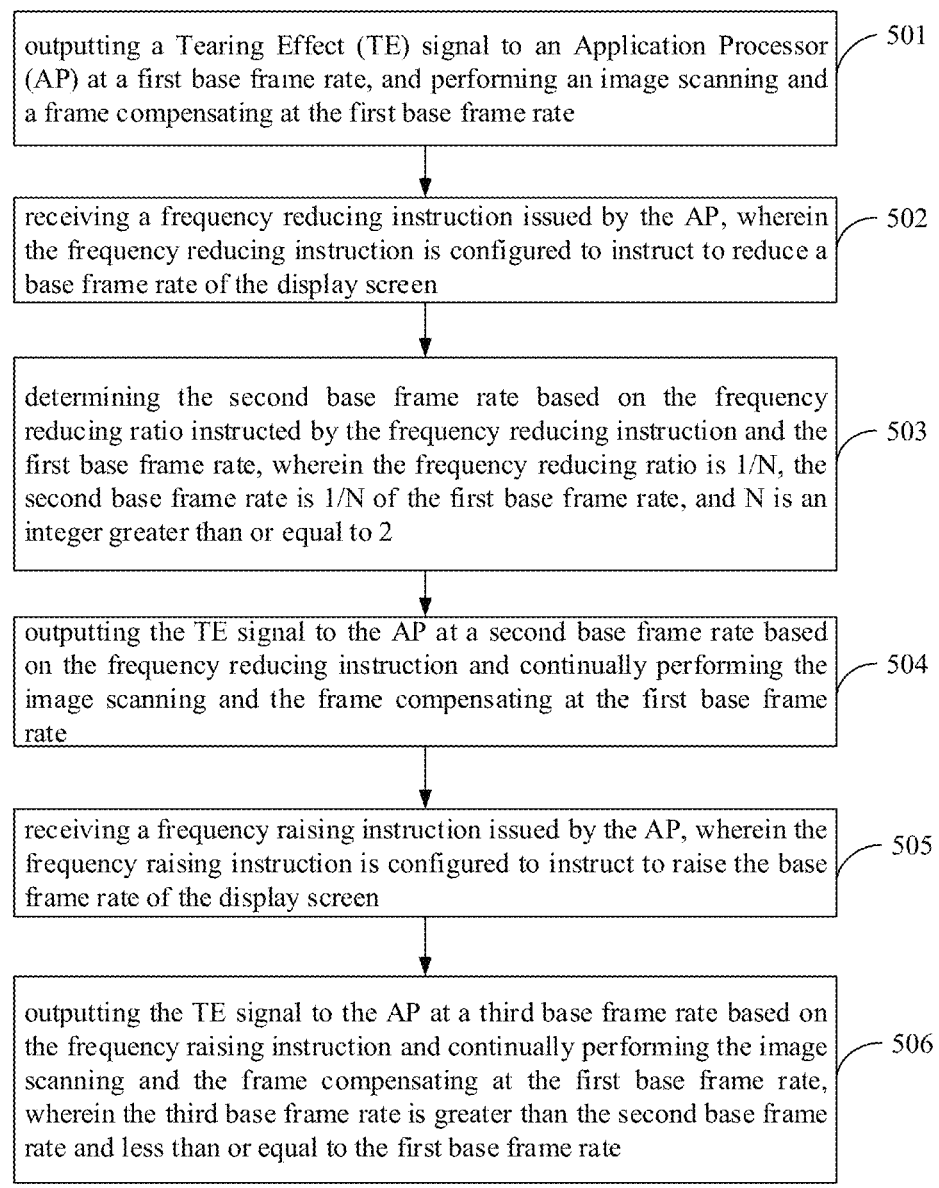
FIG. 5 is another flow chart of the display screen frequency conversion method according to some embodiments of the present disclosure.

As shown in FIG. 5, FIG. 5 is another flow chart of the display screen frequency conversion method according to some embodiments of the present disclosure. Some embodiments are illustrated by performing the method by a DDIC chip of a display screen. The method includes the following operations.

Operation 501, the method includes outputting a Tearing Effect (TE) signal to an Application Processor (AP) at a first base frame rate, and performing an image scanning and a frame compensating at the first base frame rate.

In some embodiments, the DDIC chip may generate the TE signal based on a base frame rate of the display screen by default. Accordingly, the DDIC chip may output the TE signal to the AP at the base frame rate and performs the image scanning and the frame compensating based on a DDIC timing and parameters of the display screen corresponding to the base frame rate.

In some embodiments, when the base frame rate of the display screen is 120 Hz, the DDIC chip may output the TE signal to the AP at a frequency of 120 Hz.

Operation 502, the method includes receiving a frequency reducing instruction issued by the AP, the frequency reducing instruction is configured to instruct to reduce a base frame rate of the display screen.

In some embodiments, the frequency reducing instruction issued by the APis configured to instruct a frequency reducing ratio. The frequency reducing ratio may be explicitly instructed, that is, each frequency reducing instruction may contain a currently required frequency reducing ratio. In some embodiments, the frequency reducing ratio may be determined based on the number of times that the frequency reducing instruction is issued, that is, each time that the frequency reducing instruction is issued is configured to instruct to reduce the base frame rate by one grade.

In some embodiments, the frequency reducing ratio instructed by the frequency reducing instruction is 1/N, the frequency reducing ratio is configured to instruct to reduce the base frame rate from the original base frame rate to 1/N of the original base frame rate, and N is an integer greater than or equal to 2.

In some embodiments, when the frequency reducing ratio is explicitly instructed, the DDIC chip may directly reduce the first base frame rate to 1/2, 1/3 or 1/4 based on a single frequency reducing instruction. When the base frame rate of the display screen is reduced by grades, the DDIC chip may reduce the first base frame rate to 1/2, 1/3, or 1/4 by grades based on the plurality of received frequency reducing instructions.

Operation 503, the method includes determining the second base frame rate based on the frequency reducing ratio instructed by the frequency reducing instruction and the first base frame rate, the frequency reducing ratio is 1/N, the second base frame rate is 1/N of the first base frame rate, and N is an integer greater than or equal to 2.

Furthermore, the DDIC chip may determine the second base frame rate based on the first base frame rate and the frequency reducing ratio.

In some embodiments, when the frequency reducing ratio instructed by the frequency reducing instruction is 1/2 and the first base frame rate is 120 Hz, the DDIC chip may determine the second base frame rate as 60 Hz. When the frequency reducing ratio instructed by the frequency reducing instruction is 1/4 and the first base frame rate is 120 Hz, the DDIC chip may determine the second base frame rate as 30 Hz.

Operation 504, the method includes outputting the TE signal to the AP at the second base frame rate and continually performing the image scanning and the frame compensating based on a DDIC timing and parameters of the display screen corresponding to the first base frame rate.

In some embodiments of the present disclosure, while maintaining the DDIC timing, the DDIC chip may continually perform the image scanning and the frame compensating based on the DDIC timing and the parameters of the display screen corresponding to the first base frame rate, in this way, there is no need to prepare a plurality of sets of DDIC timing and parameters of the display screen. In some embodiments, the DDIC chip may output the TE signal of the second base frame rate to the AP by skipping or combining one or more TE signals. The illustrative embodiments are shown in the following.

In some embodiments, the DDIC chip may output the TE signal of the second base frame rate to the AP by skipping one or more TE signals through the following operation.

1. The method includes determining a signal outputting interval based on the second base frame rate.

In some embodiments, when the second base frame rate is 1/N of the first base frame rate, the DDIC chip may determine that the signal outputting interval is N−1 frames, that is, the DDIC chip may output one TE signal to the AP at an interval of N−1 frame based on the DDIC timing corresponding to the first base frame rate.

In some embodiments, when the second base frame rate is 1/2 of the first base frame rate, the DDIC chip may output one TE signal to the AP at an interval of one frame based on the DDIC timing corresponding to the first base frame rate. When the second base frame rate is 1/3 of the first base frame rate, the DDIC chip may output one TE signal to the AP at an interval of two frames based on the DDIC timing corresponding to the first base frame rate, and so on.

2. The method includes outputting the TE signal to the AP based on the signal outputting interval, and a frequency of the TE signal received by the AP is the second base frame rate.

Furthermore, the DDIC chip may output the TE signal to the AP at interval based on the determined signal outputting interval. Accordingly, after receiving the TE signal with an adjusted outputting interval, the AP may identify that the frequency of the TE signal is reduced to the second base frame rate.

Figure 6:
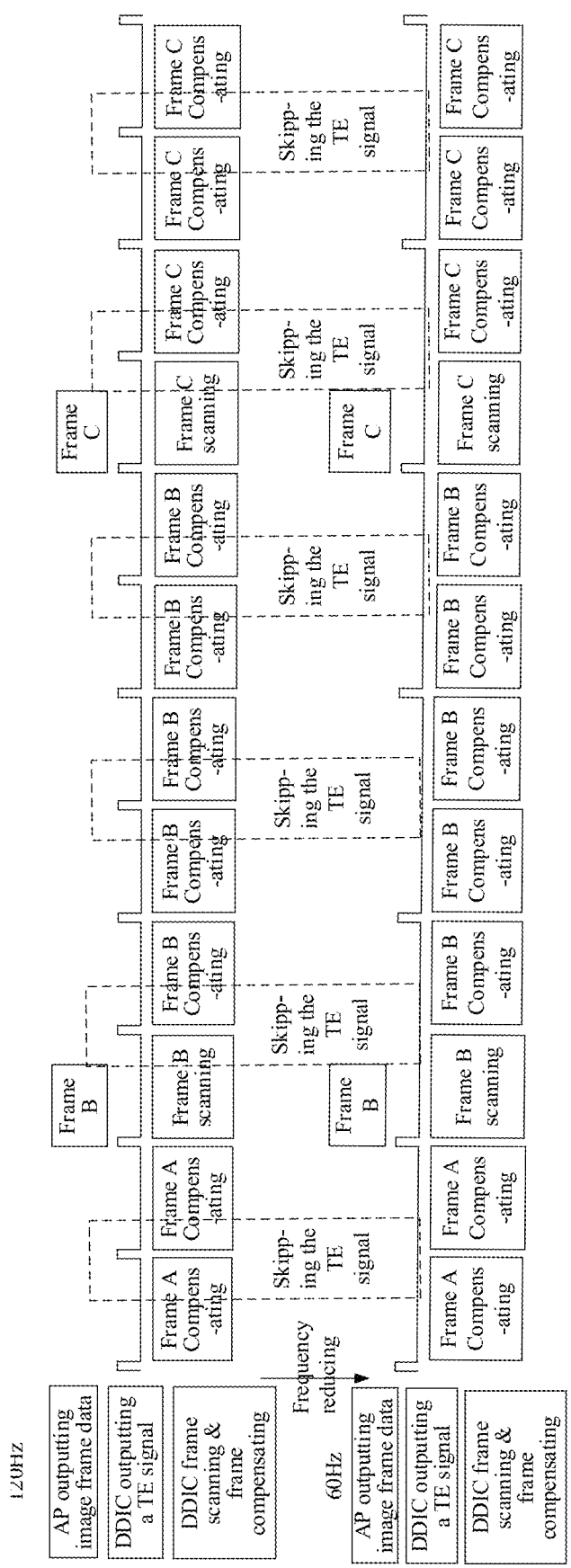
FIG. 6 is a schematic diagram illustrating an implementation of realizing the display screen frequency conversion process by skipping one or more TE signals according to some embodiments of the present disclosure.

As shown in FIG. 6, when the first base frame rate is 120 Hz and the second base frame rate is 60 Hz, that is, the frequency reducing ratio is 1/2, the DDIC chip may output one TE signal and skip the next TE signal, that is, the interval of the TE signals output to the AP is increased from 8.3 ms to 16.6 ms. Accordingly, after identifying the interval of the TE signals is increased from 8.3 ms to 16.6 ms, the AP may reduce the frequency of the image drawing from 120 Hz to 60 Hz.

Figure 7:
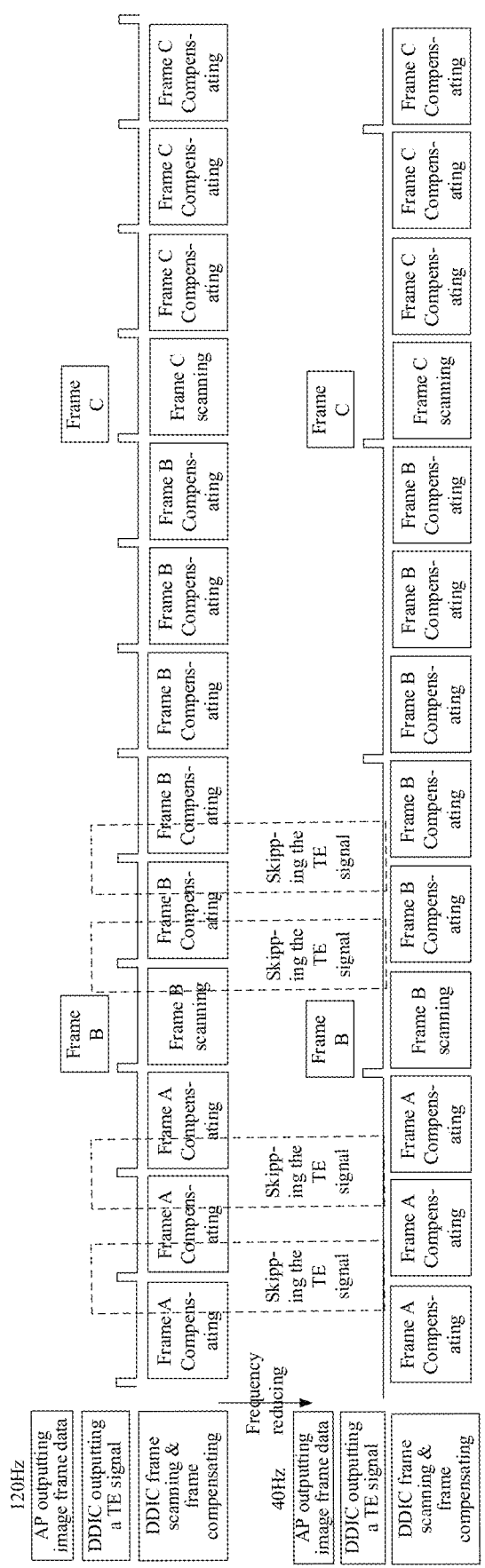
FIG. 7 is another schematic diagram illustrating an implementation of realizing the display screen frequency conversion process by skipping one or more TE signals according to some embodiments of the present disclosure.

As shown in FIG. 7, when the first base frame rate is 120 Hz and the second base frame rate is 40 Hz, that is, the frequency reducing ratio is 1/3, the DDIC chip may output one TE signal and skip the next two TE signals, that is, the interval between the TE signals output to the AP is increased from 8.3 ms to 24.9 ms. Accordingly, after identifying the interval of the TE signals is increased from 8.3 ms to 24.9 ms, the AP may reduce the frequency of the image drawing from 120 Hz to 40 Hz.

In some embodiments, the DDIC chip may output the TE signal of the second base frame rate to the AP by extending a high-level duration of the TE signal.

In some embodiments, the DDIC chip may output the TE signal with a continuous high level to the AP based on the second base frame rate. The high-level duration of the TE signal with the continuous high level is the duration of N continuous TE signals under the first base frame rate. For example, when the second base frame rate is 1/2 of the first base frame rate, the high-level duration of the TE signal with the continuous high level is the duration of two continuous TE signals under the first base frame rate. When the second base frame rate is 1/3 of the first base frame rate, the high-level duration of the TE signal with the continuous high level is the duration of three continuous TE signals under the first base frame rate.

In some embodiments, the DDIC chip may generate the TE signal with the continuous high level by combining TE signals. The process may include the following operations.

1. The method includes determining the number of the TE signals to be combined based on the second base frame rate.

In some embodiments, when the second base frame rate is 1/N of the first base frame rate, the DDIC chip may determine that the number of the TE signals to be combined is N, that is, the DDIC chip may combine N continuous TE signals based on the DDIC timing corresponding to the first base frame rate.

In some embodiments, when the second base frame rate is 1/2 of the first base frame rate, the DDIC chip may combine two continuous TE signals based on the DDIC timing corresponding to the first base frame rate. When the second base frame rate is 1/3 of the first base frame rate, the DDIC chip may combine three continuous TE signals based on the DDIC timing corresponding to the first base frame rate, and so on.

2. The method includes performing a high-level combination on the TE signals based on the number of the TE signals to be combined and outputting the TE signal with a combined high level to the AP, and the frequency of the TE signal received by the AP is the second base frame rate.

In some embodiments, when the TE signals are combined, the DDIC chip may perform the high-level combination on the TE signals, thereby extending the high-level duration of the TE signal output to the AP. Accordingly, the AP determines that the frequency of the TE signal is reduced to a second base frame rate by identifying the rising edge of the TE signal.

In some embodiments, when the frequency reducing ratio is 1/N, the DDIC chip may perform the high-level combination on the KN+1 to KN+N TE signals, and K is a natural number. For example, when the frequency reducing ratio is 1/2, the DDIC chip may perform the high-level combination on the first and the second TE signals, perform the high-level combination on the third and the fourth TE signals, and so on. When the frequency reducing ratio is 1/3, the DDIC chip may perform the high-level combination on the first, the second, and the third TE signals, perform the high-level combination on the fourth, the fifth, and the sixth TE signals, and so on.

Figure 8:
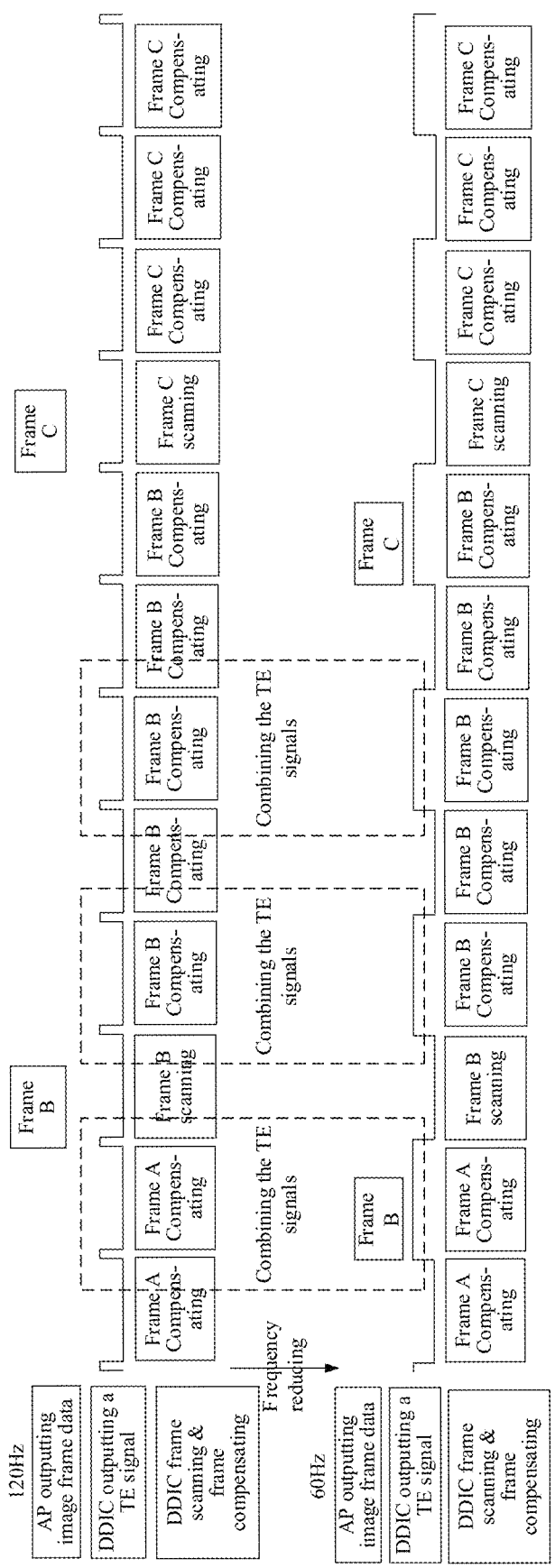
FIG. 8 is a schematic diagram illustrating an implementation of realizing the display screen frequency conversion process by combining TE signals according to some embodiments of the present disclosure.

As shown in FIG. 8, when the first base frame rate is 120 Hz and the second base frame rate is 60 Hz, that is, the frequency reducing ratio is 1/2, the DDIC chip may perform the high-level combination on the first and the second TE signals and output a combined signal, perform the high-level combination on the third and the fourth TE signals and output another combined signal, and perform the high-level combination on the fifth and the sixth TE signals and output a further combined signal. That is, the interval between the rising edges of the TE signals output to the AP is increased from 8.3 ms to 16.6 ms. Accordingly, the AP may reduce the frequency of the image drawing from 120 Hz to 60 Hz by identifying the rising edge of the TE signal.

Figure 9:
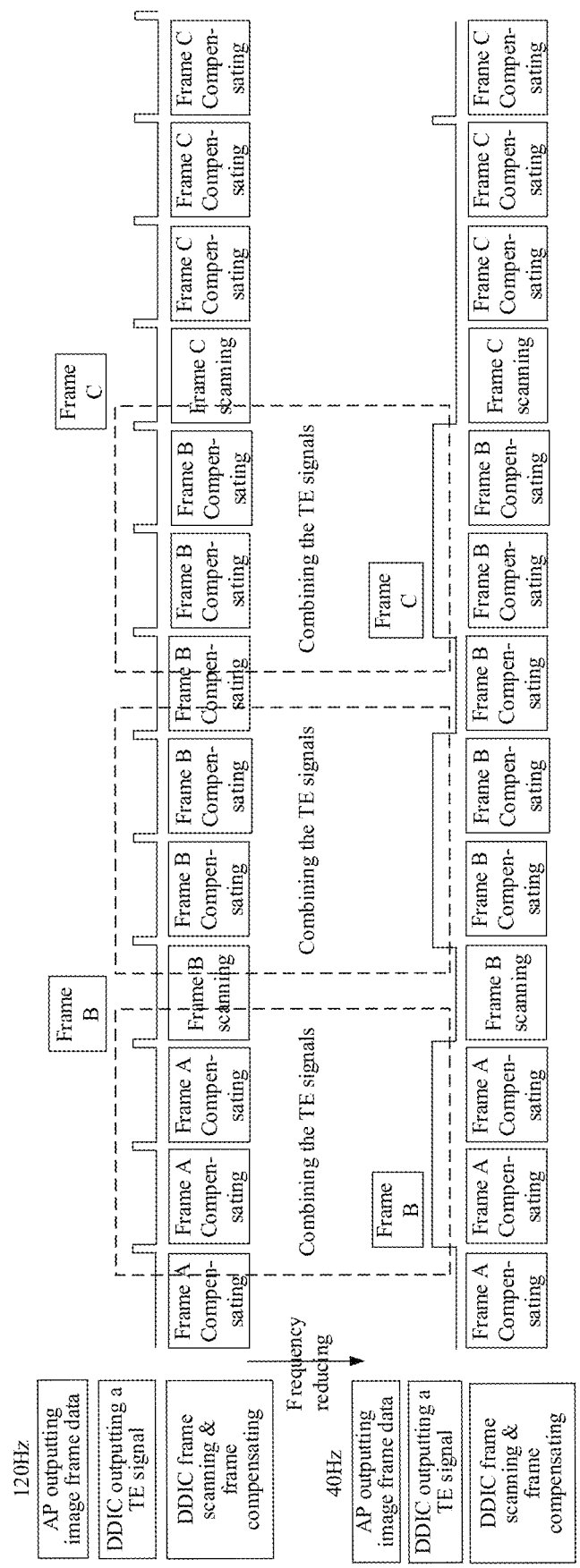
FIG. 9 is another schematic diagram illustrating an implementation of realizing the display screen frequency conversion process by combining the TE signals according to some embodiments of the present disclosure.

As shown in FIG. 9, when the first base frame rate is 120 Hz and the second base frame rate is 40 Hz, that is, the frequency reducing ratio is 1/3, the DDIC chip may perform the high-level combination to the first, the second, and the third TE signals and output a combined signal, perform the high-level combination on the fourth, the fifth, and the sixth TE signals and output another combined signal, and perform the high-level combination on the seventh, the eighth, and the ninth TE signals and output a further combined signal. That is, the interval between the rising edges of the TE signals output to the AP is increased from 8.3 ms to 24.9 ms. Accordingly, the AP may reduce the frequency of the image drawing from 120 Hz to 40 Hz by identifying the rising edge of the TE signal.

Of course, in addition to the aforesaid method of combining the TE signals to generate the TE signal with the continuous high level, the DDIC chip may also use other methods to generate the TE signal with the continuous high level, which is not limited by some embodiments of the present disclosure.

It should be noted that, compared with the method of skipping one or more TE signals, when using the method of outputting the TE signal with the continuous high level, since the TE signal has a large high-level duration, the AP may send the drawn image frame data to the DDIC chip as soon as possible by detecting the high level of the TE signal, in this way, the DDIC chip may refresh the images as soon as possible, and the display delay of the image frame may be reduced.

In some embodiments, whether the method of skipping one or more TE signals or the method of outputting the TE signal with the continuous high level is adopted, the DDIC chip may start from a moment of the image scanning and output the TE signal to the AP at the second base frame rate, so as to reduce the occurrence of an abnormal image display caused by starting from a moment of the frame compensating.

Operation 505, the method includes receiving a frequency raising instruction issued by the AP, and the frequency raising instruction is configured to instruct to raise the base frame rate of the display screen.

When the application scenario changes, the current base frame rate of the display screen may not meet the requirement of the foreground application for the base frame rate. At this time, the AP may issue the frequency raising instruction to the DDIC chip to raise the base frame rate of the display screen.

The way in which the frequency raising instruction instructs the frequency raising ratio is similar to the way in which the frequency reducing instruction instructs the frequency reducing ratio, which will not be repeated herein.

Operation 506, the method includes outputting the TE signal to the AP at a third base frame rate based on the frequency raising instruction and continually performing the image scanning and the frame compensating at the first base frame rate. The third base frame rate is greater than the second base frame rate, and less than or equal to the first base frame rate.

In some embodiments, the frequency raising instruction is configured to instruct to restore the current base frame rate to the original base frame rate. In some embodiments, the frequency raising instruction is configured to instruct to raise the current base frame rate to a base frame rate between the current base frame rate and the original base frame rate. For example, in case that the original base frame rate is 120 Hz and the current base frame rate is 40 Hz, the AP may instruct to raise the base frame rate to 120 Hz by issuing the frequency raising instruction, and accordingly, the DDIC chip may restore the frequency of the TE signal to 120 Hz. The AP may also instruct to increase the base frame rate to 60 Hz, and accordingly, the DDIC chip may raise the frequency of the TE signal to 60 Hz.

In some embodiments, the DDIC signal may output the TE signal of the third base frame rate to the AP by skipping one or more TE signals or outputting the TE signal with the continuous high level (when the first base frame rate is different from the third base frame rate). The process may refer to the aforesaid frequency reducing process, which will not be repeated herein.

In some embodiments, while maintaining the current DDIC timing and the current parameters of the display screen, the DDIC chip may reduce the frequency of the TE signal output to the AP by outputting the TE signal with the continuous high level or skipping one or more TE signals. In this way, the implementing complexity of the frequency conversion process may be reduced, and the occurrence of image flicker caused by changes of the parameters of the display screen in the frequency conversion process may be reduced.

In addition, in some embodiments, reducing the frequency of the TE signal by outputting the TE signal with the continuously high level may improve the probability that the AP detects the high level of the TE signal, and enable the AP to send the drawn image frame data to the DDIC chip timely, thereby reducing the delay between the image drawing and the display on screen.

Before the adjustment of the base frame rate and after the adjustment of the base frame rate is done, the DDIC chip may realize the automatic frequency conversion through the ADFR scheme. In some embodiments, the DDIC chip may initialize the parameters of the display screen based on the first refresh rate (the first refresh rate may be the current base frame rate). In response to receiving first image data sent by the AP, the DDIC chip may perform the image scanning based on the first refresh rate. In response to failing to receive second image data sent by the AP within a preset delay duration of a Vertical Front Porch, VFP, corresponding to the first refresh rate (i.e., in response to not receiving the second image date sent by the AP within the preset delay duration of the VFP corresponding to the first refresh rate), the DDIC may adjust the first refresh rate to the second refresh rate, and adjust the parameters of the display screen based on the second refresh rate. Herein, the second refresh rate is smaller than the first refresh rate.

In summary, as shown in Table 1, compared with the display screen frequency conversion scheme provided by the related art, some embodiments of the present disclosure have the following differences and advantages.

TABLE 1

|  | Frequency conversion scheme in the related art | Frequency conversion scheme in some embodiments of the present disclosure |
|---|---|---|
| Frequency of the TE signal | Reduced to 1/N | Reduced to 1/N |
| Frequency of the image scanning, frequency of the frame compensating | Reduced to 1/N | Unchanged |
| DDIC timing | Changed | Unchanged |
| Gamma Cost | Need to add gamma, high cost | Shared gamma, low cost |
| Flicker caused by the frequency conversion | Serious | None |

In some embodiments, the method provided by some embodiments of the present disclosure may be performed by a mobile terminal, that is, the DDIC chip of the display screen in the mobile terminal may perform the aforesaid display screen frequency conversion method. The display screen may be an Organic Light Emitting Diode (OLED) display screen. Since the mobile terminal is usually powered by a battery, and the power value of the battery is limited or sensitive to the power consumption, when the method provided by some embodiments of the present disclosure is performed by the mobile terminal, it may reduce the waste of power consumption caused by still using the high refresh rate in a scenario with a low refresh rate. Herein, the mobile terminal may include a smart phone, a tablet computer, a wearable device (such as a smart watch), a portable personal computer, etc. Some embodiments of the present disclosure do not limit specific types of the mobile terminal.

Of course, the method provided by some embodiments of the present disclosure may also be used for or performed by other non-battery powered terminals, such as a television, a display screen, a personal computer, etc., which is not limited by the embodiments of the present disclosure.

Some embodiments of the present disclosure also provide a DDIC chip. The DDIC chip is applied to a display screen, and the DDIC chip is configured to: output a Tearing Effect (TE) signal to an Application Processor (AP) at a first base frame rate, and perform an image scanning and a frame compensating at the first base frame rate; receive a frequency reducing instruction issued by the AP; and output the TE signal to the AP at a second base frame rate based on the frequency reducing instruction and continually perform the image scanning and the frame compensating at the first base frame rate. Herein, the frequency reducing instruction is configured to instruct to reduce a base frame rate of the display screen, and the second base frame rate is less than the first base frame rate.

In some embodiments, the DDIC chip is configured to: determine the second base frame rate based on the frequency reducing ratio instructed by the frequency reducing instruction and the first base frame rate; and output the TE signal to the AP at the second base frame rate. Herein, the frequency reducing ratio is 1/N, the second base frame rate is 1/N of the first base frame rate, and N is an integer greater than or equal to 2.

In some embodiments, the DDIC chip is further configured to: determine a signal outputting interval based on the second base frame rate; and output the TE signal to the AP based on the signal outputting interval. Herein, a frequency of the TE signal received by the AP is the second base frame rate.

In some embodiments, the DDIC chip is further configured to: output the TE signal with a continuous high level to the AP at the second base frame rate. Herein, a high-level duration of the TE signal with the continuous high level is a duration of N continuous TE signals under the first base frame rate.

In some embodiments, the DDIC chip is configured to: output the TE signal to the AP at the second base frame rate starting from a moment of the image scanning.

In some embodiments, the DDIC chip is configured to: continually perform the image scanning and the frame compensating based on a DDIC timing and parameters of the display screen corresponding to the first base frame rate.

In some embodiments, the DDIC chip is further configured to: receive a frequency raising instruction issued by the AP; and output the TE signal to the AP at a third base frame rate based on the frequency raising instruction and continually perform the image scanning and the frame compensating at the first base frame rate. Herein, the frequency raising instruction is configured to instruct to raise the base frame rate of the display screen, and the third base frame rate is greater than the second base frame rate, and less than or equal to the first base frame rate.

In some embodiments, the DDIC chip is applied to an Organic Light Emitting Diode (OLED) display screen.

In some embodiments, the DDIC chip is a DDIC chip of the display screen in a mobile terminal.

Figure 10:
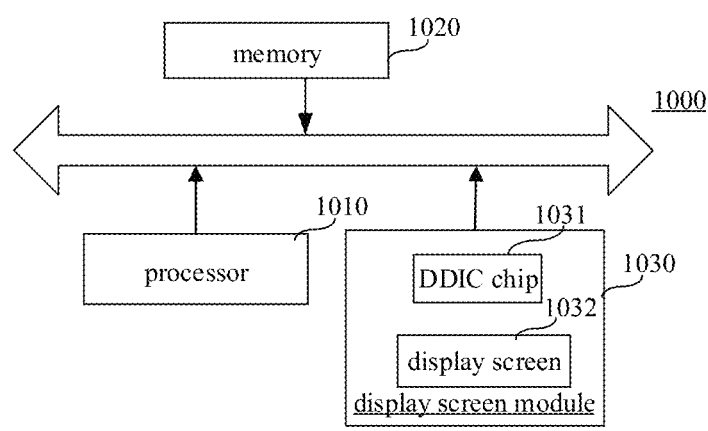
FIG. 10 is a structural block diagram of a terminal according to some embodiments of the present disclosure.

As shown in FIG. 10, FIG. 10 is a structural block diagram of a terminal according to some embodiments of the present disclosure. The terminal 1000 may be a smart phone, a tablet computer, a notebook computer, etc. The terminal 1000 provided by some embodiments of the present disclosure may include one or more of the following components: a processor 1010, a memory 1020, and a display screen module 1030.

The processor 1010 may include one or more processing cores. The processor 1010 may be connected to various parts of the entire terminal 1000 by using various interfaces and lines, and execute various functions of the terminal 1000 and process data by running or executing instructions, programs, code sets, or instruction sets stored in the memory 1020, and calling data stored in the memory 1020. In some embodiments, the processor 1010 may be implemented in at least one hardware form of a Digital Signal Processing, DSP, a Field-Programmable Gate Array, FPGA, and a Programmable Logic Array, PLA. The processor 1010 may integrate one or more of a Central Processing Unit, CPU, a Graphics Processing Unit, GPU, a Neural Network Processing Unit, NPU, and a modem. The CPU mainly handles an operating system, a user interface, an application program, or the like. The GPU is configured to render and draw the content required to be displayed by the display screen module 1030. The NPU is configured to implement an Artificial Intelligence, AI, function. The modem is configured to handle a wireless communication. It may be understood that, the aforesaid modem may also be realized by a single chip which is not integrated into the processor 1010.

The memory 1020 may include a Random-Access Memory, RAM or a Read-Only Memory, ROM. In some embodiments, the memory 1020 may include a non-transitory computer-readable storage medium. The memory 1020 may be configured to store instructions, programs, codes, code sets, or instruction sets. The memory 1020 may include a storage program area and a storage data area. The storage program area may store instructions configured to realize the operating system, instructions configured to realize at least one function (such as a touch function, a sound playing function, an image playing function, etc.), instructions configured to realize various method embodiments of the present disclosure, etc. The storage data area may store data (such as audio data, a phone book, etc.) created based on the use of the terminal 1000.

The display screen module 1030 is a display assembly configured to display image, and typically located on a front panel of the terminal 1000. The display screen module 1030 may be designed as a full screen, a curved screen, a special-shaped screen, a dual-sided screen, or a foldable screen. The display screen module 1030 may also be designed as a combination of the full screen and the curved screen, or a combination of the special-shaped screen and the curved screen, which is not limited herein.

In some embodiments of the present disclosure, the display screen module 1030 may include a DDIC chip 1031 and a display screen 1032 (i.e., a display panel). The display screen 1032 may be an OLED display screen. The OLED display screen may include a Low Temperature Poly-Silicon, LTPS, Active-Matrix Organic Light-Emitting Diode, AMOLED, display screen or a Low Temperature Polycrystalline Oxide, LTPO, Active-Matrix Organic Light-Emitting Diode, AMOLED, display screen.

The DDIC chip 1031 is configured to drive the display screen 1032 to display images and execute the display screen frequency conversion method provided by the aforesaid embodiments. In addition, the DDIC chip 1031 is connected to the processor 1010 through a MIPI interface and is configured to receive the image data and instructions issued by the processor 1010.

In some embodiments, the display screen module 1030 also includes a touch function. The user may use any suitable object, such as fingers, touch pens, etc., to perform a touch operation on the display screen module 1030 through the touch function.

In addition, those skilled in the art may understand that the structure of the terminal 1000 shown in the aforesaid figures does not constitute a limitation to the terminal 1000, and the terminal may include more or fewer components than shown in the figures, combine some components, or have different component arrangements. For example, the terminal 1000 may also include a microphone, a speaker, a Radio Frequency, RF, circuit, an input unit, a sensor, an audio circuit, a Wireless Fidelity, WIFI, module, a power supply, a Bluetooth module, and other components, which will not be repeated herein.".

Those skilled in the art may aware that, in one or more aforesaid examples, the functions described in some embodiments of the present disclosure may be implemented by a hardware, a software, a firmware, or any combination thereof. When implemented by the software, the functions may be stored in a computer readable medium or transmitted as one or more instructions or codes on a computer readable medium. The computer readable medium includes a computer storage medium and a communication medium. The communication medium includes any medium that facilitates the transfer of a computer program from one place to another. A storage medium may be any available medium that can be accessed by a general-purpose computer or a special-purpose computer.

The aforesaid description is only optional embodiments of the present disclosure and is not intended to limit the present disclosure. Any modification, equivalent replacement, improvement, etc., made within the spirit and principles of the present disclosure should be included in the protection scope of the present disclosure.

What is claimed is:

1. A terminal comprising an Application Processor (AP), a display screen, and a Display Driver Integrated Circuit (DDIC) chip, the AP and the DDIC chip being connected through a Mobile Industry Processor Interface (MIPI), and the DDIC chip being configured to execute:
    outputting a Tearing Effect (TE) signal to an Application Processor (AP) at a first base frame rate, and performing an image scanning and a frame compensating at the first base frame rate;
    receiving a frequency reducing instruction issued by the AP, wherein the frequency reducing instruction is configured to instruct to reduce a base frame rate of the display screen; and
    outputting the TE signal to the AP at a second base frame rate based on the frequency reducing instruction to enable the AP to send image data to the DDIC at the second base frame rate and continually performing the image scanning and the frame compensating at the first base frame rate to enable the display screen to refresh images at the first base frame rate after outputting the TE signal to the AP at the second base frame rate based on the frequency reducing instruction, wherein the second base frame rate is less than the first base frame rate;
    wherein the continually performing the image scanning and the frame compensating at the first base frame rate comprises: continually performing the image scanning and the frame compensating based on a DDIC timing and parameters of the display screen corresponding to the first base frame rate.

2. A Display Driver Integrated Circuit (DDIC) chip applied to a display screen, and the DDIC chip being configured to:
    output a Tearing Effect (TE) signal to an Application Processor (AP) at a first base frame rate, and perform an image scanning and a frame compensating at the first base frame rate;
    receive a frequency reducing instruction issued by the AP, wherein the frequency reducing instruction is configured to instruct to reduce a base frame rate of the display screen; and
    output the TE signal to the AP at a second base frame rate based on the frequency reducing instruction to enable the AP to send image data to the DDIC at the second base frame rate and continually perform the image scanning and the frame compensating at the first base frame rate to enable the display screen to refresh images at the first base frame rate after outputting the TE signal to the AP at the second base frame rate based on the frequency reducing instruction, wherein the second base frame rate is less than the first base frame rate;
    wherein the DDIC chip is configured to continually perform the image scanning and the frame compensating based on a DDIC timing and parameters of the display screen corresponding to the first base frame rate.

3. The DDIC chip as claimed in claim 2, wherein the DDIC chip is configured to:
    determine the second base frame rate based on the frequency re ducing ratio instructed by the frequency reducing instruction and the first base frame rate, wherein the frequency reducing ratio is 1/N, the second base frame rate is 1/N of the first base frame rate, and N is an integer greater than or equal to 2; and
    output the TE signal to the AP at the second base frame rate.

4. The DDIC chip as claimed in claim 3, wherein the DDIC chip is further configured to:
    determine a signal outputting interval based on the second base frame rate; and
    output the TE signal to the AP based on the signal outputting interval, wherein a frequency of the TE signal received by the AP is the second base frame rate.

5. The DDIC chip as claimed in claim 3, wherein the DDIC chip is further configured to:
    output the TE signal with a continuous high level to the AP at the second base frame rate, wherein a high-level duration of the TE signal with the continuous high level is a duration of N continuous TE signals under the first base frame rate.

6. The DDIC chip as claimed in claim 3, wherein the DDIC chip is configured to:
    output the TE signal to the AP at the second base frame rate starting from a moment of the image scanning.

7. The DDIC chip as claimed in claim 2, wherein the DDIC chip is further configured to:
    receive a frequency raising instruction issued by the AP, wherein the frequency raising instruction is configured to instruct to raise the base frame rate of the display screen; and
    output the TE signal to the AP at a third base frame rate based on the frequency raising instruction and continually perform the image scanning and the frame compensating at the first base frame rate, wherein the third base frame rate is greater than the second base frame rate and less than or equal to the first base frame rate.

8. The DDIC chip as claimed in claim 2, wherein the DDIC chip is applied to an Organic Light Emitting Diode (OLED) display screen.

9. The DDIC chip as claimed in claim 2, wherein the DDIC chip is a DDIC chip of the display screen in a mobile terminal.

10. A display screen frequency conversion method performed by a Display Driver Integrated Circuit (DDIC) of a display screen, the method comprising:
    outputting a Tearing Effect (TE) signal to an Application Processor (AP) at a first base frame rate, and performing an image scanning and a frame compensating at the first base frame rate;
    receiving a frequency reducing instruction issued by the AP, wherein the frequency reducing instruction is configured to instruct to reduce a base frame rate of the display screen; and
    outputting the TE signal to the AP at a second base frame rate based on the frequency reducing instruction to enable the AP to send image data to the DDIC at the second base frame rate and continually performing the image scanning and the frame compensating at the first base frame rate to enable the display screen to refresh images at the first base frame rate after outputting the TE signal to the AP at the second base frame rate based on the frequency reducing instruction, wherein the second base frame rate is less than the first base frame rate;
    wherein the continually performing the image scanning and the frame compensating at the first base frame rate comprises: continually performing the image scanning and the frame compensating based on a DDIC timing and parameters of the display screen corresponding to the first base frame rate.

11. The method as claimed in claim 10, wherein the outputting the TE signal to the AP at a second base frame rate based on the frequency reducing instruction comprises:
    determining the second base frame rate based on the frequency reducing ratio instructed by the frequency reducing instruction and the first base frame rate, wherein the frequency reducing ratio is 1/N, the second base frame rate is 1/N of the first base frame rate, and N is an integer greater than or equal to 2; and
    outputting the TE signal to the AP at the second base frame rate.

12. The method as claimed in claim 11, wherein the outputting the TE signal to the AP at the second base frame rate comprises:
    determining a signal outputting interval based on the second base frame rate; and
    outputting the TE signal to the AP based on the signal outputting interval, wherein a frequency of the TE signal received by the AP is the second base frame rate.

13. The method as claimed in claim 12, wherein the signal outputting interval is N−1 frames.

14. The method as claimed in claim 11, wherein the outputting the TE signal to the AP at the second base frame rate comprises:
    outputting the TE signal with a continuous high level to the AP at the second base frame rate, wherein a high-level duration of the TE signal with the continuous high level is a duration of N continuous TE signals under the first base frame rate.

15. The method as claimed in claim 11, wherein the outputting the TE signal to the AP at the second base frame rate comprises:
    outputting the TE signal to the AP at the second base frame rate starting from a moment of the image scanning.

16. The method as claimed in claim 10, wherein after the outputting the TE signal to the AP at a second base frame rate based on the frequency reducing instruction and performing the image scanning and the frame compensating at the first base frame rate, the method further comprises:
    receiving a frequency raising instruction issued by the AP, wherein the frequency raising instruction is configured to instruct to raise the base frame rate of the display screen; and
    outputting the TE signal to the AP at a third base frame rate based on the frequency raising instruction and continually performing the image scanning and the frame compensating at the first base frame rate, wherein the third base frame rate is greater than the second base frame rate and less than or equal to the first base frame rate.

17. The method as claimed in claim 10, wherein the display screen is an Organic Light Emitting Diode (OLED) display screen.

18. The method as claimed in claim 10, wherein the method is performed by the DDIC chip of the display screen in a mobile terminal.

* * * * *